United States Patent [19]

Papst

[11] 4,036,030
[45] July 19, 1977

[54] ASSEMBLY FOR THE DAMPING OF FLEXURAL AND TORSIONAL VIBRATION IN THE SHAFTS OF MACHINES

[76] Inventor: Hermann Ernst Robert Papst, Karl-Maier-Strasse 1, St. Georgen, Germany

[21] Appl. No.: 506,043

[22] Filed: Sept. 16, 1974

[30] Foreign Application Priority Data

Sept. 18, 1973  Germany .............................. 2346969

[51] Int. Cl.² .......................... F16C 1/00; F16C 3/00
[52] U.S. Cl. ......................................... 64/1 V; 64/3; 74/574; 188/1 B; 308/1 R
[58] Field of Search ................... 64/26, 1 V, 1 R, 23, 64/3; 74/504; 308/1; 188/1 B

[56] References Cited

U.S. PATENT DOCUMENTS

| 1,464,220 | 8/1923 | Sachs et al. | 64/26 |
|---|---|---|---|
| 2,418,315 | 4/1947 | Presser | 64/26 |
| 2,691,283 | 10/1954 | Stover | 64/1 R |
| 2,780,212 | 2/1957 | Malcolm | 64/1 X |
| 3,058,559 | 10/1962 | Ohrnberger | 74/574 |
| 3,263,450 | 8/1966 | Condon | 64/26 |
| 3,552,804 | 1/1971 | Bracken, Jr. | 74/574 |
| 3,673,813 | 7/1972 | Wright | 64/26 |
| 3,692,370 | 9/1972 | Hasz | 308/1 |

*Primary Examiner*—Benjamin W. Wyche
*Assistant Examiner*—Randall Heald
*Attorney, Agent, or Firm*—Allegretti, Newitt, Witecoff & McAndrews

[57] ABSTRACT

Disclosed is an assembly for the damping of flexural and torsional vibration in the shafts of machines, for instance in the spindles of machine tools, wherein said spindle or shaft between two bearings thereof is surrounded by a bending resistant sleeve or tube with a clearance defined between both parts, which sleeve rotates with said shaft, whereby the clearance gap is filled with a damping viscous medium, preferably lubricating oil.

15 Claims, 6 Drawing Figures

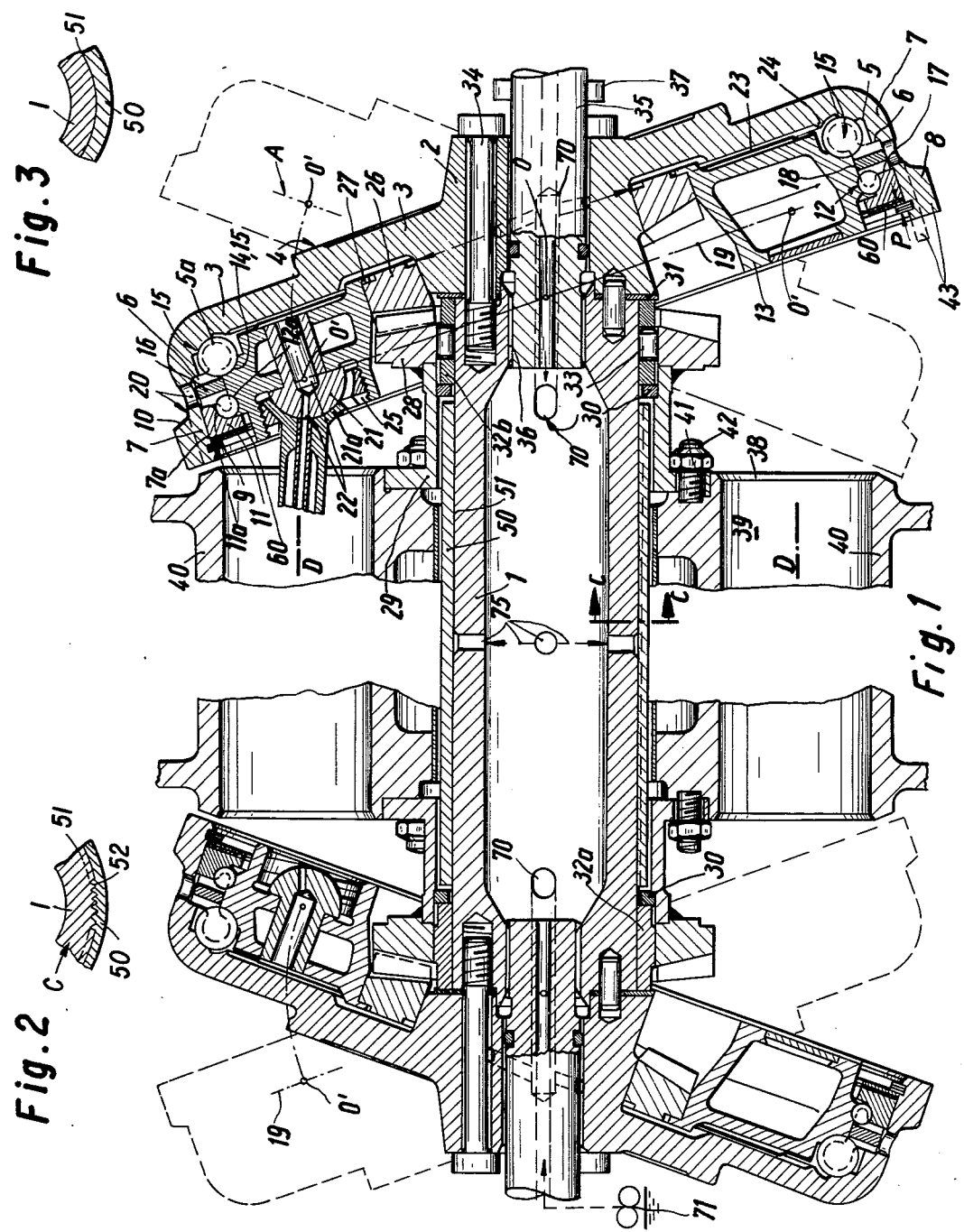

ASSEMBLY FOR THE DAMPING OF FLEXURAL AND TORSIONAL VIBRATION IN THE SHAFTS OF MACHINES

The present invention relates to an assembly for the damping of flexural and torsional vibration in a shaft or spindle of internal combustion engines or machine tools.

In prime movers of the internal combustion type, and also in the spindles of machine tools, there arise substantial problems with respect to vibration, particularly in the case of periodically acting piston forces and also intermittent cutting operations. This may result in oscillating (or chattering) and hammering stresses when passing through resonances, particularly upon gears.

It is an object of the present invention to provide an assembly for the damping of flexural and torsional vibration in a shaft mounted in a machine frame, especially for an internal combustion engine of the axial piston type, which assembly in an easy and operationally safe manner acts to greatly attenuate or fully eliminate resonant vibration. In such case, the resulting stresses or rotational deflections, and in particular deflections of the shaft in radial direction out of the alignment with the axis of rotation, no longer exceed the values which the structural analysis has been based upon. At the same time, this provides quietness of the running engine.

Vibration increased by resonance may be detrimental to the gears, particularly in the case of internal combustion engines of the axial piston type, which gears act to prevent the wobble ring which is connected to the connecting rods from rotating relative to the cylinder block.

Such vibration within the gear may produce wedge-type pressures between the gear teeth with incalculable forces which may result in failure.

Likewise, in the spindles of machine tools, for instance of a turning machine, especially intermittent cutting operations result in vibration which in an inadmissible manner impairs the cutting pattern due to chatter marks, and to still greater degree the precision. For this reason, as known, machine tools cannot be built too solid or heavy. John Witworth previously determined that the thickness of the spindle of a lathe should correspond to one half of the height of centers. Long bearings are not yet capable of providing complete damping because the oil rotates within the bearing along with the shaft, i.e., it moves relative to the bearing.

According to the present invention, the assembly for the damping of flexural and torsional vibration of a rotating shaft, especially for an axial piston-type engine of the above-indicated kind, consists in that the shaft has positioned thereon, with a slight play or clearance for a damping medium, a tubular body which rotates with the shaft.

The clearance may be e.g., of the order of the bearing play between the shaft and the bearing. This clearance is constantly kept filled with a viscous substance, preferably a high molecular liquid, such as oil, or even with a semi-liquid substance having cold flow characteristics, such as isobutylene (PIB) or the like, preferably under pressure and flowing continuously through the clearance.

In the assembly according to the present invention, the likewise rigid damping tube being coupled to the shaft through the damping medium, rotates together with the shaft. In this way, flexures of the shaft towards the tube rotating therewith effect correspondingly frequent displacement flows of the damping medium within the gap between the shaft and the bending resistant tubular body, whereby the damping energy is converted into heat. Thus, a damping effect up to the aperiodic elimination of any vibrational deflections can be obtained.

An additional advantage is obtained if the shaft has on its outer surface a longitudinally profiled pattern, e.g. splines, while the tubular body has an interior profile adapted to such profiled pattern and gearing with a sufficient clearance between both parts. With this damping assembly, in addition to the flexural vibration, the periodic rotational vibration occuring during the power transmission is damped or absorbed, too.

The abovementioned principle could preferably be used also in automotive vehicles in order to reduce traffic noise.

In the case of machine tools, a pressurized damping medium may further be supplied through the bearings supporting the shaft.

In the following, the invention is described in greater detail by referring to the accompanying drawings, wherein:

FIG. 1 is a longitudinal sectional view of an axial piston-type engine showing the features of the present invention, in which the center portion of the engine block is broken away and the central shaft is shown greatly shortened;

FIG. 2 is an enlarged part view of the sectioned portion C—C in FIG. 1;

FIG. 3 is a view of a modified embodiment of a vibration damped central shaft in a showing similar to FIG. 2;

Figure 4:
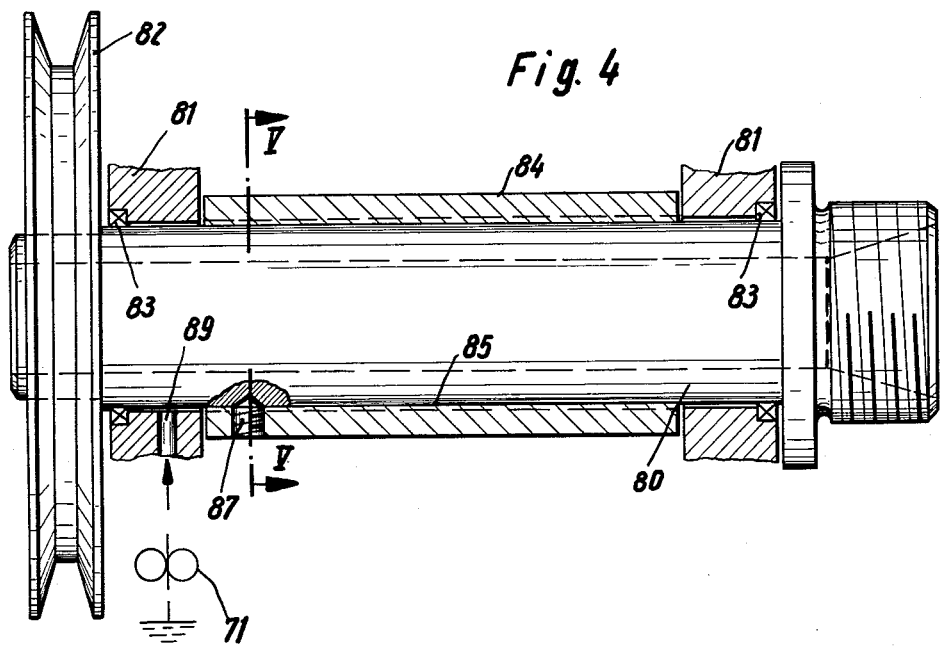
FIG. 4 shows the construction of a machine tool spindle being vibration damped in accordance with the invention, with the bearing area being shown in longitudinal section.

In the axial piston-type engine illustrated in FIG. 1, the one front end of a shaft 1 has mounted thereon, by means of a hub 2, a rotary swash plate 3 having at its radially outermost periphery an axially extending cylindrical jacket rim 7 which is integrally connected to said rotary swash plate 3 and which, for instance, may be cast integrally therewith or forged from a casehardened steel, whereby such cylindrical jacket rim is so long in axial direction as to extend across anti-friction bearings in the form of ball bearings 12 and 15 positioned within said swash plate 3. At the radially outer edge of the rotary swash plate 3, there is provided, integrally connected therewith, a race 5 of an inner ball bearing 15 having a center line 5a of the race track or raceway, whereby the hardness of such ball bearing may be provided e.g., by a corresponding case hardening process.

The ball bearings 12 and 15 mount a wobble ring 13 interiorly of the dish-shaped configuration of the rotary swash plate 3 in which pivot bearings 21a (not specifically illustrated) of connecting rods are mounted by means of a mating ring 25 on ball pins 21. The connecting rods supported by their connecting rod bearing brasses extend with their opposite ends into the cylinders 39 provided in the cylinder block 40, in which cylinders the counteracting pistons (not illustrated) are reciprocatingly moved by the combustion pressure.

The combustion forces transmitted from the cylinders to the wobble ring 13 effect rotation of the rotary swash plate 3 through the ball bearings 12 and 15, whereby the wobble ring 13 oscillates around the wobble center O between the two terminal positions indicated in the drawing wherein one of said terminal positions is indicated in broken lines only at A. It is most favorable for the power transmission and for the oscillatory motion if the centers O' are in the same plane 19 as the wobble center O.

In order to prevent the wobble ring 13 from rotating, this ring is retained against rotation by a camming bevel (gear) support comprising bevel gears 26 and 28, whereby the bevel gear 26 is securely connected to a shoulder 27 of the wobble ring 13 with light abutment. The bevel gear 28 is securely connected to the front face 38 of the engine cylinder block 40 by means of a centering hub 29 and a thrust ring 30 as well as stud bolts 42.

Intermediate the ring 30 and an adjustment disc or washer 31 in front of the hub 2, both ends of the shaft 1 are provided with a radial bearing 32 each which may be formed either as a friction bearing 32a (compare the left hand side of FIG. 1) or, alternatively, as a roller bearing 32b (compare the right hand side of FIG. 1) including radial bearing rollers 33.

The hub 2 is secured to the end face of the shaft 1 by means of fastening bolts 34 tightened with a bias. Through the hub, a power take-up shaft 35 is inserted into the shaft 1 by means of splines 36 at the side of the hub opposite from said shaft 1. The power take-up shaft 35 may be supported in an axial bearing 37.

The ball bearings 12 and 15 transmit power between the wobble ring 13 and the rotary swash plate 3 and, at the same time, guide or mount the wobble ring 13 at its radially outer side, act between the radially outer race 5 of the inner ball bearing 15 and a radially outer race 11a of the outer ball bearing 12 which latter race and bearing are provided on an inserted, axially movable raceway 11. The respective radially inner races 14 and 12a of the inner ball bearing 15 and of the outer ball bearing 12, respectively, are positioned on the periphery of the wobble ring 13.

The arrangement of the ball bearing rollers of different sizes is positioned under different angles relative to the center plane 19 of the raceways (or running paths of the balls), whereby the respective cage portions of the cage 16 or of individual cages 16, respectively, rotate at equal speeds. This is obtained when the diameters of the rolling or camming points 11a, 5a are each commonly disposed in a cylindrical surface. Thereby, the ball diameters are dimensioned such that the speeds of the balls along the raceways are equal, whereby the essential difference in major part results from the different inclinations of the raceways.

The inertia forces which act periodically upon the cage 16 are taken up by a thrust face 6 at the inner side of the rotary swash plate 3 and by a radial thrust face 17 on the inserted, axially movable raceway 11.

The raceway 11 abuts the cylindrically ground inner wall 7a of the cylindrical jacket rim 7 of the rotary swash plate 3, whereby it is retained by a spring ring 9 at its side opposing the cylinder block 40. A spring element 60 is inserted between the spring ring 9 and the outer side of the raceway 11. This spring element 60 may consist of springs which by means of a clamp-like element and with the aid of a mounting shoulder 10 are successively pressed in around the full circumference of the spring ring between the inner side of the spring ring 9 and the outer face of the raceway 11. When wear occurs after a prolonged period of operation, these springs then have sufficient working capability so as to readily compensate for wear of the order of between 5 microns and 50 microns (or even up to 500 microns).

In order to facilitate assembly, a shoulder 24 is provided on the inner side of the rotary swash plate in radial direction inwards at the edge of the race 5 of the inner ball bearing 15.

For lubricating purposes interiorly of the rotary swash plate, the oil is supplied from a central oil supply 70 (oil pumping system 71) such that the oil flows in a radial outward direction between the wobble ring 13 and the rotary swash plate 3, as indicated by the arrows. The oil flow is split up at a stamped sheet metal ring 23, whereby part of the oil flows through the center bore of the ballpin 21 via a hole 22 each into the connecting rods, while the other portion of the oil flow passes to the ball bearings 12 and 15 and then, after lubricating them, flows radially outward through holes 20. The sheet metal ring 23 is secured to the wobble ring 13 by spot welding.

Between the radial bearings 32 (i.e., friction bearings 32a) and the thrust rings 30, a sleeve-like body in the form of a tubular member 50 is positioned around the shaft 1, and with a fit which is of the order of the normal bearing play of e.g., 1/1000 diameters or for instance 0.06 millimeters. The tube 50 has its axial ends positioned between the rings 30, and it floats freely on the surface of the shaft 1, whereby the gap or clearance 51 between the tube 50 and the surface of the shaft 1 is filled with a high molecularly, preferably cold flowing liquid, such as oil or isobutylene. This liquid damping medium provides a great damping action to flexural vibration already with a very slight flexure of the shaft. The oil may be introduced into the clearance 51 in any of various ways, e.g. through one or more transverse bores 75 in the center plane of the engine from the interior of the shaft merely by centrifugal effect or under the pressure of an oil pump 71. In the case of flexures, the clearance experiences a variation mainly of its radial thickness such that the damping forces act hydraulically.

If both the shaft 1 and the tube 50 — as shown in FIG. 2 — are provided with splines 52 or with a similar profile, the tube 50 is even capable of attenuating torsional vibration.

In FIG. 1, the supply of the damping liquid is shown to take place from the left hand side by the oil pump 71 which is present anyhow and which in an automotive vehicle may be positioned preferably adjacent the oil reservoir.

The above-described damping principle is also effective if a corresponding damping body is positioned interiorly or a shaft of if such damping body has a rectangular or hexagonal cross-section instead of a circular cross-section. In the case of a polygonal cross-section, the splines may be provided in the thicker portions of the walls. The use of a so-called K-profile is likewise possible.

Figure 5:
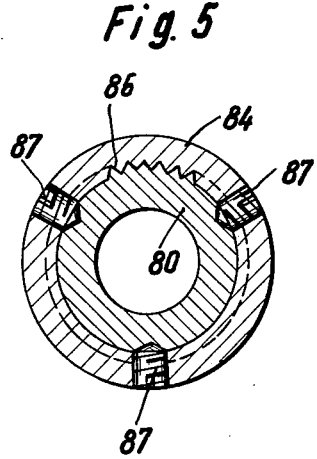
FIG. 5 is a cross-sectional view of the construction of FIG. 4 along lines V—V therein.
Figure 6:
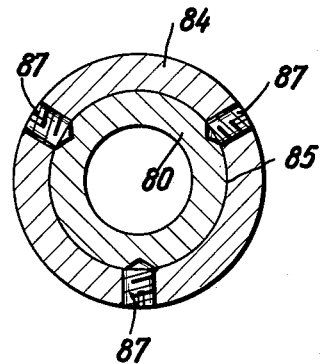
FIG. 6 is a sectional view similar to FIG. 5 of a modified embodiment of the invention.

As shown as example in FIGS. 4 - 6, the damping principle according to the invention, independently of its described use in an axial piston-type engine, may be employed in a variety of other machine elements. The spindle of a machine tool has a pulley 82 mounted on a shaft 80 (formed e.g. as a hollow shaft) and is supported in bearings 81 which are sealed from the outside by means of gaskets 83. Around the shaft 80 there is positioned a vibration damping tube 84. The association to, and spacing from, the shaft 80 may be exactly the same as in the case of the tube 50 according to FIG. 1. Between the tube 84 and the shaft 80 there is provided a suitable narrow gap or clearance 85 (FIG. 6) which may be alternatively modified in the form of splines 86 or with any other suitable longitudinal profile (FIG. 5). If the tube 84 — which rotates with the shaft 80 — is fixed e.g., by means of pointed screws 87, the damping tube may simultaneously act as an axial bearing with its end faces. The damping oil is pressed into the gap or clearance 85 by means of an oil pump 71 through a hole 89, thereby at the same time lubricating the bearing 81. Of course, the oil inlet and oil outlet may be arranged and formed in various ways. Also, there may be provided additional seals or gaskets, e.g., in the form of O-rings, of a bearing metal.

What I claim is:

1. An assembly for the damping of flexural and torsional vibrations in a rotatable machine shaft which extends between a pair of spaced bearings, the improvement comprising:
   a bend resistant tubular member surrounding said shaft,
   means for rotating said tubular member in the same direction and at substantially the same speed as said shaft,
   a minute clearance defined between said shaft and tubular member between said bearings,
   a viscous damping medium filling said clearance, and
   supply means for supplying said clearance with said medium under pressure through said shaft.

2. The assembly of claim 1 including a profiled surface on said shaft in said clearance.

3. The assembly of claim 2 wherein said profiled surface comprises a plurality of splines.

4. The assembly of claim 1 wherein said viscous damping medium comprises lubricating oil.

5. The assembly of claim 1 wherein said shaft is straight.

6. The assembly of claim 1 wherein said viscous damping medium fills said clearance and supply means for supplying said clearance with said medium under pressure through one of said bearings.

7. The assembly of claim 1 wherein said means for rotating said tubular member comprises means connecting said tubular member to said shaft for simultaneous rotation.

8. The assembly of claim 1 wherein a substantial mass is mounted to said shaft adjacent at least one of the ends of said shaft and said shaft has a length substantially greater than the length of said tubular member.

9. An assembly for the damping of flexural and torsional vibrations in a rotatable machine shaft which extends freely over a substantial distance between a pair of spaced bearings, said assembly comprising:
   a tubular member coaxially arranged around said shaft over at least a substantial portion of the length of said shaft between said bearings,
   means for rotating said tubular member in the same direction and at substantially the same speed as said shaft,
   a clearance defined between the outer surface of said shaft and the inner surface of said tubular member, the magnitude of said clearance being approximately equal to the play of said bearings during operation of said shaft,
   a flowing viscous damping medium filling said clearance, and
   supply means for continuously supplying said clearance with said flowing viscous medium under pressure through said shaft.

10. The assembly of claim 9 including a profiled surface in said clearance on at least one of said outer surface of said shaft and said inner surface of said tubular member.

11. The assembly of claim 9 wherein said viscous damping medium is a lubricating oil.

12. The assembly of claim 9 wherein said means for rotating said tubular member comprises means connecting said tubular member to said shaft for simultaneous rotation.

13. The assembly of claim 9 wherein a substantial mass is mounted to said shaft adjacent at least one of the ends of said shaft and said shaft has a length substantially greater than the length of said tubular member.

14. An assembly for the damping of flexural and torsional vibrations in a rotatable machine shaft which extends between a pair of spaced bearings, the improvement comprising:
   a bend resistant tubular member surrounding said shaft,
   means for rotating said tubular member in the same direction and at substantially the same speed as said shaft,
   a minute clearance defined between said shaft and tubular member between said bearings,
   a viscous damping medium in said clearance, and
   a profiled surface on said shaft comprising a plurality of splines in said clearance.

15. An assembly for the damping of flexural and torsional vibrations in a rotatable machine shaft which extends freely over a substantial distance between a pair of spaced bearings, said assembly comprising:
   a tubular member coaxially arranged around said shaft over at least a substantial portion of the length of said shaft between said bearings,
   means for rotating said tubular member in the same direction and at substantially the same speed as said shaft,
   a clearance defined between the outer surface of said shaft and the inner surface of said tubular member, the magnitude of said clearance being approximately equal to the play of the said bearings during operation of said shaft,
   a flowing viscous damping medium filling said clearance,
   means for continuously maintaining said clearance filled with said flowing viscous medium, and
   a profiled surface on said shaft comprising a plurality of splines in said clearance.

* * * * *

UNITED STATES PATENT OFFICE
CERTIFICATE OF CORRECTION

Patent No. 4,036,030          Dated July 19, 1977

Inventor(s) Herman Ernst Robert Papst

It is certified that error appears in the above-identified patent and that said Letters Patent are hereby corrected as shown below:

Column 4, line 56, "or" should read -- of --.

Column 4, line 56, "of" should read -- or --.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*